March 26, 1963

P. J. MILLER 3,082,791

ROTARY SELECTOR VALVE

Filed March 8, 1961

INVENTOR.
PAUL J. MILLER

BY
RICHEY, McNENNY & FARRINGTON

Donald W. Farrington
ATTORNEYS

United States Patent Office 3,082,791
Patented Mar. 26, 1963

3,082,791
ROTARY SELECTOR VALVE
Paul J. Miller, Maple Heights, Ohio, assignor to The Weatherhead Company, Cleveland, Ohio, a corporation of Ohio
Filed Mar. 8, 1961, Ser. No. 94,330
1 Claim. (Cl. 137—625.21)

This invention relates generally to valves and more particularly to rotary selector valves for use in vacuum systems.

Vacuum control and actuator systems are often employed where low cost and low power control systems are useful and a source of vacuum is readily available. A typical application of such a control system is for the heating and ventilating control in an automobile where the automobile engine provides the vacuum source. The various valves and dampers of the system are readily operated by vacuum actuators, and such a system is not only low in cost to manufacture, but lends itself to a variety of dashboard controls.

It is a principal object of this invention to provide a novel rotary selector valve for use with vacuum systems which provides for a large number of selected positions to control vacuum in a plurality of interconnected vacuum lines such as may be employed in the heating and ventilating control of an automobile.

It is another object of this invention to provide a novel rotary selector valve for use in vacuum systems which comprises a pair of valve plates, one of which is rotatable relative to the other, and which are openly mounted and require no enclosure or housing for either sealing or mounting purposes.

It is another object of this invention to provide a novel rotary selector valve for use in vacuum systems which comprises a pair of relatively rotatable plates and which employs a novel combination spring and mounting bracket which serves to mount the valve as well as to hold the valve parts together as a unitary assembly. The combination spring and mounting bracket is generally C-shaped to extend on both sides of the valve plate and to extend around only a small fraction of the periphery of the plates and which serves to clamp the plates together by spring action.

It is another object of this invention to provide a rotary selector valve for vacuum systems in accordance with the preceding objects in which during all positions of the valve a vacuum chamber exists between the valve plates to allow the atmospheric pressure to bias the valve plates together to prevent leakage of the atmosphere into the valve and vacuum source.

Further objects and advantages of this invention relating to its small and compact size, simple construction and low cost of manufacture will readily become apparent to those skilled in the art upon a more complete understanding of the invention as disclosed in the accompanying drawings and described in the following detailed description.

Figure 1:
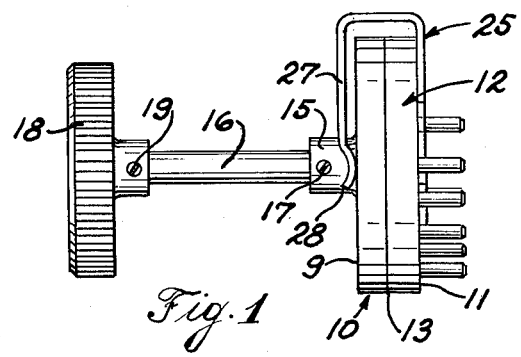
FIG. 1 is a side elevational view of a rotary vacuum selector valve in accordance with the present invention.
Figure 2:
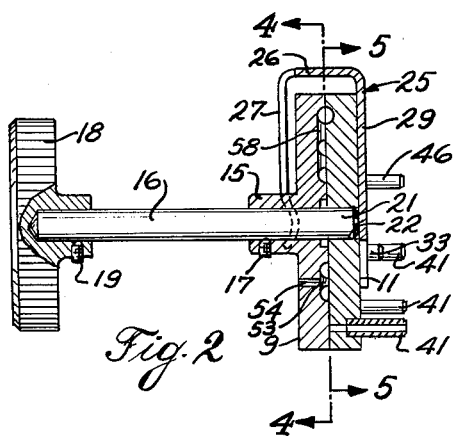
FIG. 2 is a longitudinal cross-sectional view through the valve.
Figure 3:
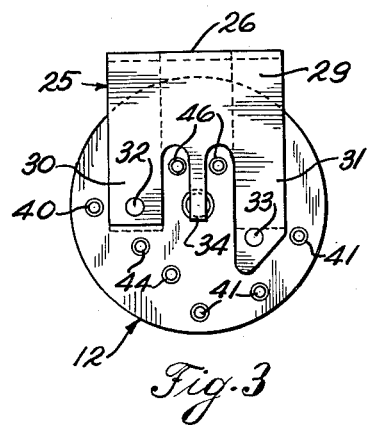
FIG. 3 is an end elevational view of the rear of the valve showing the vacuum line connections.
Figure 4:
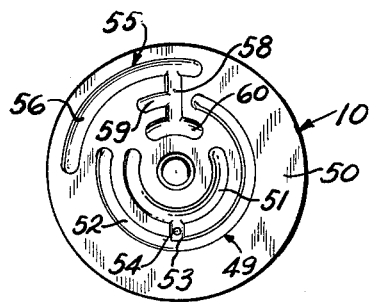
FIG. 4 is a cross-sectional view taken on line 4—4 of FIG. 2 and showing the face of the rotary valve plate.
Figure 5:
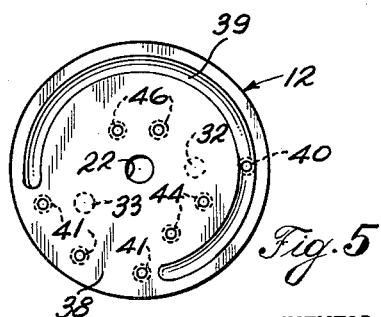
FIG. 5 is a cross-sectional view taken on line 5—5 of FIG. 2 and showing the face of the stationary valve plate.

Referring now to the drawings in greater detail, the valve shown therein includes front and rear valve plates 10 and 12, respectively. These valve plates are disc-shaped with cylindrical outer surfaces of substantially the same diameter and abut against each other along a contact plane indicated at 13. The front valve plate 10 has a projecting hub 15 on its front face 9 and is provided with an axial bore to receive a control shaft 16. The control shaft 16 is secured to the front valve plate 10 by a set screw 17 or other suitable fastening means located on hub 15. At the other end of control shaft 16 there is mounted a control knob 18 secured to the control shaft by a set screw 19.

At its other end, control shaft 16 has a projecting end 21 extending rearwardly of the front valve plate 10 to be rotatably received within a bore 22 in the rear valve plate 12. Thus both the front and rear valve plates are mounted on the control shaft 16 which maintains both plates in alignment when the front plate 10 is rotated relative to the rear plate 12 through rotation of the control knob 18 and control shaft 16.

A spring member 25 is provided to serve both as a mounting bracket for the valve and to hold the two valve plates 10 and 12 together as a unitary assembly. This spring member 25 is formed from a sheet of spring material to assume a generally C-shaped configuration. The spring member 25 includes a top portion 26 which extends axially along and is spaced away from the outer surfaces of the valve plates 10 and 12. A pair of fingers 27 extend downward along the front face 9 of front valve plate 10 and terminate in tip portions 28 adapted to make bearing contact with the front face 9 of the front valve plate on diametrically opposed sides of the hub 15. Thus the tips 28 provide a biasing force at points symmetrically disposed about the axis of control shaft 16 and prevent any cocking of the plates relative to each other.

The spring member 25 also has a rear section 29 which extends downward from the top portion 26 to make surface abutting contact along the rear face 11 of the rear valve plate 12. The rear section 29 includes a pair of spaced arms 30 and 31 which are perforated at their lower ends to fit over a pair of projecting pegs 32 and 33, respectively, projecting from the rear face 11 of the rear valve plate 12. A narrow, centrally disposed arm 34 projects downward from section 29 between the arms 30 and 31 to extend across the rear end of bore 22. Thus, the front and rear arms of the spring member 25 bias the valve plates 10 and 12 toward each other to insure that they will make a sealing contact along their contact plane 13. Furthermore, the top portion 26 of the spring member is spaced away from the peripheries of the valve plates and can be conveniently used as a mounting bracket for the valve.

The connections to the valve are made through a number of projecting nipples containing port passages on the rear face 11 of rear valve plate 12. Adjacent the outer periphery, a vacuum nipple 40 is positionel adjacent the one rear arm 30 of spring member 25 and is connected to a suitable vacuum source. Nipple 40 communicates with an arcuate channel 39 on the inner face 38 of rear valve plate 12. Channel 39 extends around the inner face 38 along an arc concentric with the control shaft 16 for an arc length of substantially 270°. At the same radius from the control shaft 16, a series of additional outer nipples 41 are positioned to contain passages opening into the inner face 38 at points intermediate the ends of the channel 39. Additional nipples are provided at lesser distance from the central axis and include nipples 44 at an intermediate distance and inner nipples 46. These nipples 41, 44 and 46 are adapted to connect with various valve, actuators and other parts of the vacuum system.

The valving between the port passages in the nipples is controlled by channels on the inner face 50 of the front valve plate 10. These channels are arranged in two separate groups, of which one group 49 comprises inner channel 51 and intermediate channel 52 which are interconnected through a radially extending connecting channel 53. A passage 54 extends through the front valve plate 10 to its front face from the connecting channel 53 as an air bleed passage, so that the inner and intermediate channels 51 and 52 of this group will always be at atmospheric pressure.

The other group 55 of channels on the inner face 50 of the front valve plate 10 includes an outer channel 56 having an arc length somewhat greater than 90° so that it will be connected with the channel 39 on the rear valve plate at all times regardless of the rotational position of the valve plates. A radially extending channel 58 extends inward from one end of outer channel 56 to communicate with intermediate channel 59 and inner channel 60. It will be seen that this arrangement of channels on front valve plate 10 and the connecting ports positioned at the various nipples on the rear valve plate 12 serve to insure that the various connecting nipples 41, 44 and 46 may be selectively connected either to the atmosphere through the first group of channels on the front valve plate or to vacuum through the second group of channels. Although a particular arrangement of nipples and channels has been described, this has been done for purposes of illustration only and it is understood that various other configurations may be adopted as required by the arrangement of controls and actuators to be connected to the valve.

The valve is effectively sealed by the contact between the inner faces 38 and 50 of the rear and front valve plates 12 and 10, respectively, since these surfaces are machined flat and covered with a thin film of lubricant during assembly. Since the pressures involved in vacuum systems are relatively low, no additional seals or a valve cover or body are required. However, it will be seen that the valve plates 10 and 12 are biased together to maintain a leak free sealing contact between them by two separate forces. On the one hand, the spring force of spring member 25 maintains a constant bias at all times. An additional sealing force is provided by the fact that the channel 39 on rear valve plate 12 and the second group of channels 55 on the front valve plate 10 are always connected to vacuum regardless of the rotary position of the valve. These channels provide a vacuum chamber at all times between the valve plates 10 and 12 so that the external atmospheric pressure provides an additional biasing or sealing force tending to hold the valve plates in abutting contact.

Although only one particular embodiment of the invention has been shown in the drawings and described in the foregoing detailed description, it is understood that this embodiment represents only one of many within the scope of the invention, and those skilled in the art may resort to other arrangements and modifications without departing from the scope of the invention as defined in the appended claim.

What is claimed is:

A rotary valve comprising first and second valve plates adapted to make surface abutting contact with each other and being relatively rotatable around a common axis, port means on one of said valve plates, passage means on the other of said valve plates adapted to interconnect said port means, a U-shaped spring clip member having opposed legs at least one being bifurcated, one leg portion of said clip being secured to one of said valve plates, the opposed leg portion of said clip being shaped to contact the other of said valve plates symmetrically with respect to the valve axis and resiliently pressing against said other valve plate to bias said valve plates into abutting contact.

References Cited in the file of this patent

UNITED STATES PATENTS

| | | |
|---|---|---|
| 1,745,244 | Capell | Jan. 28, 1930 |
| 2,026,506 | Binnall | Dec. 31, 1935 |
| 2,422,996 | Wendt | June 24, 1947 |

FOREIGN PATENTS

| | | |
|---|---|---|
| 547,447 | Belgium | May 15, 1956 |